United States Patent [19]

Merritt, Jr. et al.

[11] Patent Number: 5,017,012

[45] Date of Patent: May 21, 1991

[54] VIEWING SYSTEM FOR SURFACE PROFILER

[75] Inventors: Edward J. Merritt, Jr., Caledonia; Joan E. Samuels; Joseph R. Bietry, both of Rochester, all of N.Y.

[73] Assignee: Chapman Instruments, Inc., Rochester, N.Y.

[21] Appl. No.: 389,430

[22] Filed: Aug. 4, 1989

[51] Int. Cl.$^5$ ............................................. G01B 11/30
[52] U.S. Cl. ................................................. 356/371
[58] Field of Search ............... 356/371, 127, 357, 359, 356/120, 129, 364; 350/236, 237

[56] References Cited

U.S. PATENT DOCUMENTS

| | | | |
|---|---|---|---|
| 4,062,623 | 12/1977 | Suzuki et al. | 356/371 |
| 4,353,650 | 10/1982 | Sommargren | 356/371 |
| 4,358,201 | 11/1982 | Makosch | 356/357 |

Primary Examiner—Richard A. Rosenberger
Assistant Examiner—Hoa Pham
Attorney, Agent, or Firm—Harry W. Barron

[57] ABSTRACT

A previewing profiler includes apparatus to scan the surface of an object and to provide a display relating to the smoothness of the surface at a microscopic level. The system includes providing a polarized collimated laser beam through a Nomarski type prism and focusing the resulting beams on the surface to be scanned. The system further includes a user operable rotatable mirror which may be inserted, upon operator command, between the laser and Nomarski prism, which mirror is designed to leak a small percentage of the laser light. Another source of noncollimated polarized light, provided through a condensing lens, is provided to the rotatable mirror to be directed along the same path through the Nomarski prism and to be focused at a point above the surface being scanned, thereby providing a substantially larger illuminated area on the surface. The reflected light from both the laser beam and additional noncollimated light is focused on a CCD array and then displayed on a display. This permits the user to view the area to be profiled, including the profile line, prior to operating the profiler.

24 Claims, 1 Drawing Sheet

VIEWING SYSTEM FOR SURFACE PROFILER

This invention relates to a surface roughness profiler, and more particularly, to such a profiler having a selectively operable viewing system to permit the operator of the profiler to view the area of the surface being profiled prior to obtaining data relating to the profile.

BACKGROUND OF THE INVENTION

In many products, it is extremely important to have an extremely smooth surface in order to permit the product to properly operate. For example, computer hard disks must have a certain flatness within very small limits in order to permit data to be properly stored on the disk. Other devices which require extremely smooth surfaces include optical components, such as lenses and mirrors, silicon wafers and optical discs. In each of these devices, micro-irregularities on the polished surface can spell the difference between an acceptable product and a rejected product. For the above noted devices, irregularities in the order of microns, or millionths of a meter, are critical. To assure proper product quality, the critically smooth products must be tested prior to release to the consumer.

DESCRIPTION OF THE PRIOR ART

In the past, people have suggested using various types of surface profilers to measure the micro-irregularities in products designed to have extremely smooth surfaces. One such device is described in U.S. Pat. No. 4,422,764 in the name of Jay M. Eastman and entitled, "Interferometer Apparatus For Microtopography". This patent describes a system for directing a monochromatic laser beam towards a surface and for detecting the reflections from the surface in order to determine the topology of the surface. The Eastman device is essentially an interferometer for measuring distances. Another system which has been suggested is the MP 2000 noncontact surface profiler manufactured and sold by the assignee hereof and previously by Photographic Sciences Corporation of Rochester, N.Y. This type of a device provides the laser signal to the surface through a special type of prism which modifies the polarity of the incident laser beam to permit two orthogonal polarized exit beams to strike the surface at slightly different points. Upon reflection, these two beams are recombined and the polarity of the resulting beam may be measured to determine variations in the surface topology. The results of the topology measuring apparatus may be analyzed by computers and provided to a display to manifest changes in slope on the surface.

In many instances, it is desirable to preview the surface in order to denote any major flaws, such as scratches or pits, prior to actually operating the surface profiler. In other instances, the surface to be profiled may need to be properly positioned to avoid channels, edges or the like designed into the product. In still other circumstances, it is necessary to provide alignment using alignment marks to be sure the proper critical surface is profiled. In such circumstances, it would be desirable to provide a view of the surface to be profiled on a conventional display device, such as a television monitor. Such a view would permit the operator of the profiler to properly position the surface to be profiled to avoid edges, or other designed in breaks, or major flaws or to position the surface to be profiled with preexisting alignment markers on the surface.

Existing surface profilers scan across a narrow line on the surface and measure depth variations on the surface in the order of one micron, or less. Because of the optics required to permit such fine measurements, any major depth change, such as an edge, can result in a loss of focus and cessation of proper operation of the profiler. To determine the position of such major depth changes and to position the profile line to avoid these major depth changes, one must view an area significantly greater than the size of the line being scanned across the device. Such an area may be in the order of hundreds or thousands of times greater in order to provide meaningful visual information to the operator. For example, the width of the scan line may be in the order of a micron, whereas the desired width of area to be viewed may be in the order of a millimeter.

When adding a optical viewing system to a conventional surface profiler, it, of course, is desirable to utilize as many of the existing components as possible. For example, in conventional surface profilers, the surface being profiled is placed on a stage which is moved rather than utilizing moving optical elements such as rotating mirrors. Thus, the viewing mode of operation should utilize the same moving sample table and, where possible, the same objective lens system which focuses the profiling laser beam on the sample. Further, the viewing system should be selectively inserted or removed from the system so that the profiling may occur without the interference caused by the viewing apparatus.

SUMMARY OF THE INVENTION

In accordance with one aspect of this invention there is provided a topology scanning system, in which a first beam of polarized light is directed by various optical elements along a defined path and is focused on a surface of an object to be scanned and in which one of the optical elements separates the first beam into a plurality of different polarization component beams prior to being focused on the surface, the improvement of optical viewing apparatus for viewing the surface being scanned. The optical viewing apparatus comprises means for providing a polarized second beam of light and optical display means for providing a visual display manifested by the light provided thereto. Further, the viewing apparatus includes light reflecting means for being selectively inserted into the path prior to the separation of the beam, where the light reflecting means further permits a portion of the first beam to pass therethrough. Lastly, the viewing apparatus includes means for directing the second beam towards the light reflecting means and along a portion of the defined path towards the surface and for directing the light from the first and second beams being reflected from the surface towards the light reflecting means to the optical display means.

BRIEF DESCRIPTION OF THE DRAWINGS

One preferred embodiment of the subject invention is hereafter described with specific reference being made to the following figures in which.

DETAILED DESCRIPTION

Figure 1:
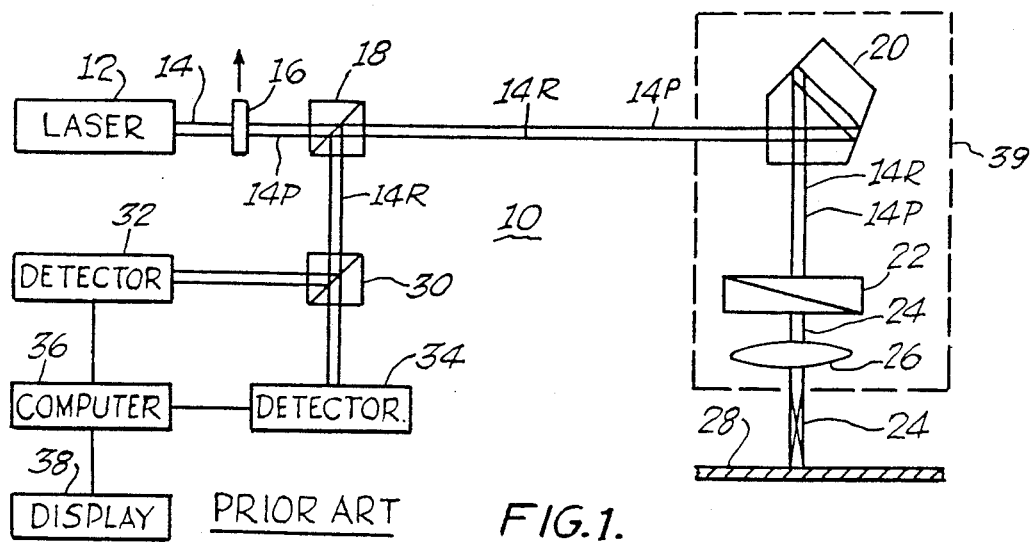
FIG. 1 shows the prior art surface profiler into which the inventive viewing apparatus is to be included.

Referring now to FIG. 1, a prior art surface profiler system 10 is shown, which is similar to the MP 2000 manufactured and sold by the assignee of this application and previously by Photographic Science Corporation. Surface profiler system 10 includes a laser beam generator 12, which provides a monochromatic laser beam 14 through a polarizer 16 to provide a polarized laser beam 14P. The polarized laser beam 14P is provided through a beam splitter 18 to a penta prism 20, which bends the beam by 90 degrees and applies it to a Nomarski wedge 22. As is well known, the Nomarski wedge splits the applied polarized laser beam 14P into two beams 24 which are polarized at right angles to one another. More specifically, the two beams 24 from the output side of the Nomarski wedge 22 are polarized at angles of plus and minus 45 degrees with respect to the original polarization of beam 14P and will be hereafter referred to as orthogonal polarized beams 24. The orthogonal polarized beams 24 are provided through objective lens 26 and focused on the surface 28 being profiled.

Figure 2:
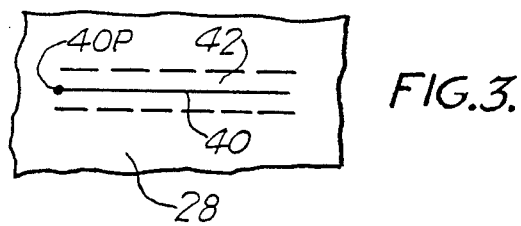
FIG. 2 shows the manner in which two orthogonal beams are positioned on the surface being profiled.

As seen in FIG. 2, the two orthogonal beams 24 are focused at slightly different spots along surface 28. The difference in focusing distance may be in the order of one or more tenths of micron and the overall diameter of each focal spot may be in the order of one micron.

Referring again to FIG. 1, the two orthogonal polarized beams 24 focused on surface 28 are reflected back through objective lens 26 and Nomarski wedge 22, where the pair of orthogonal polarized beams 24 are recombined into a single reflected beam 14R. If surface 28 is perfectly smooth, reflected beam 14R will not have a phase shift between the two component parts merged into return beam 14R. However, if any vertical difference exists on surface 28 at the points the two orthogonal polarized beams 24 are focused on surface 28, the polarization of reflected beam 14R will deviate in polarity from the beam reflected back from a flat surface and the degree of deviation will manifest the difference in vertical positioning on surface 28 at the two positions at which the two orthogonal polarized beams 24 are focused. This is due to the greater distance traveled by one of the beams 24 relative to the other of beams 24.

The reflected beam 14R is then provided through penta prism 20 and a portion of reflected beam 14R is reflected by beam splitter 18 and provided to a second beam splitter 30. Beam splitter 30 provides a portion of the reflected beam 14R to detector 32 and another portion of the reflected beam 14R to detector 34. By making beam splitter 30 a polarizing beam splitter, different polarized signals are provided to each of detectors 32 and 34. The output voltage from each of detectors 32 and 34 is provided to a computer 36, which can determine the relative phase shift between the two orthogonally polarized components of the reflected beam 14R. By continuously monitoring the change of polarization of reflected beam 14R and integrating the resulting signal, the profile of surface 28 can be determined and displayed on display 38.

Figure 3:
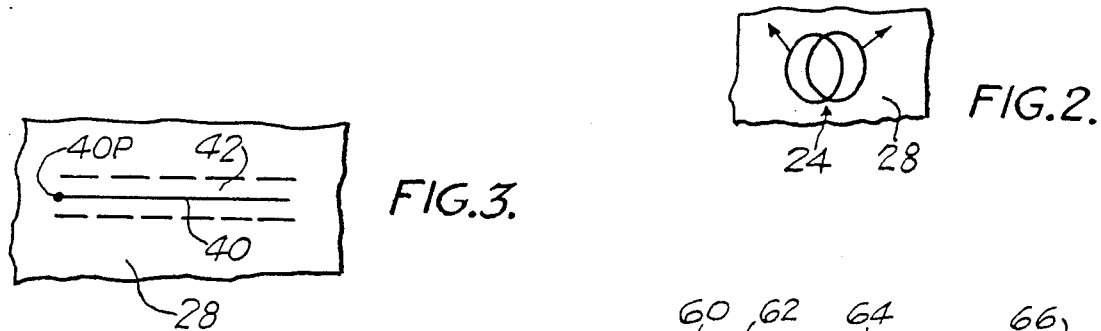
FIG. 3 shows the surface scan.

Referring to FIG. 3, when profiler 10 is being used, surface 28 is placed on a test sample table (not shown). The portion 39 of profiler 10, consisting of penta prism 20, Nomarski prism 22 and objective lens 24, is controlled by motor apparatus (not shown) to move penta prism 20, Nomarski prism 22 and objective lens 24 in tandem, so that the orthogonal polarized laser beams 24 scans a line 40 along surface 28 beginning from point 40P. Line 40 is approximately one micron in width and up to four inches (100 millimeters) in length. The output waveform appearing on display 38 manifests the depth profile of surface 28 along line 40.

In many instances, it is desired to preview the area around line 40 in order to determine if any major flaws or manufactured surface edges exist or to determine if the proper portion of surface 28 is being profiled based upon some alignment marking. In other instances, particularly due to the shape of the object to be measured, it is difficult for the operator to be certain that surface 28 is properly aligned beneath the orthogonally polarized beams 24 and a preview of the area to be profiled is desirable. One reason for such previewing is to view certain features, such as the edge of surface 28. In previewing the portion of surface 28 to be profiled, one cannot obtain sufficient information or see major flaws by merely viewing along the one micron wide line 40; rather to properly preview the area to be profiled, a much wider area, in the order of approximately one millimeter in width, should be viewed at a much smaller magnification factor. For example, the previewed area 42 is shown by the dashed lines in FIG. 3.

Figure 4:
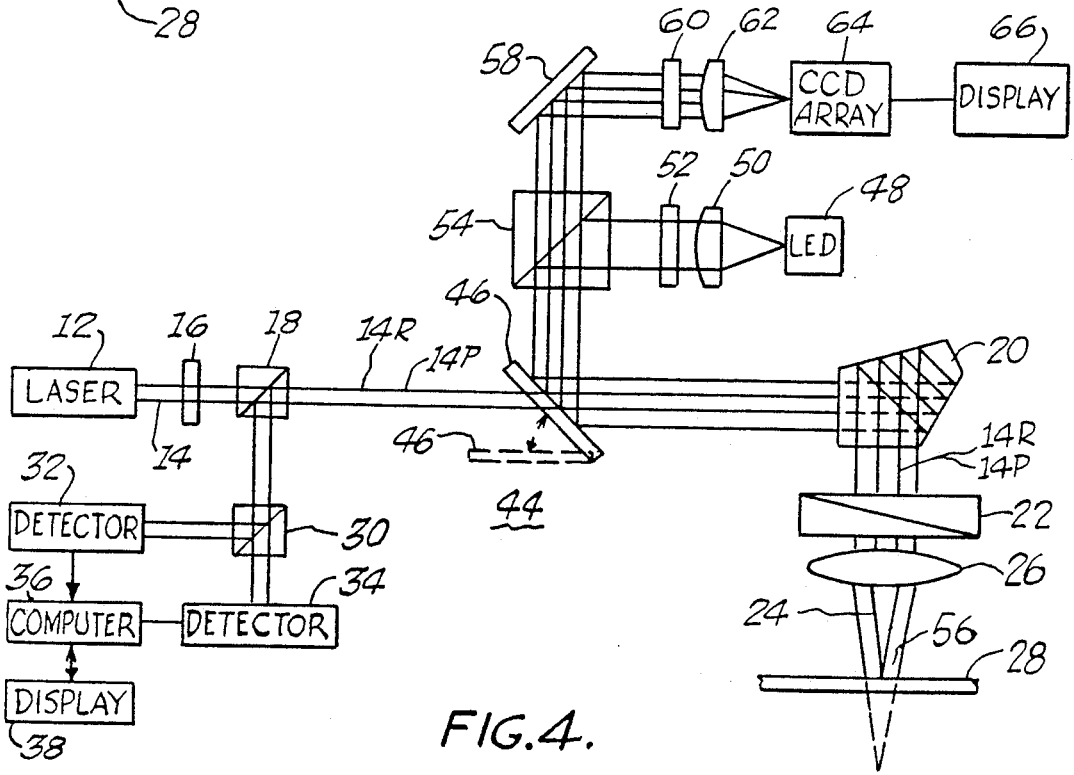
FIG. 4 shows the surface profiler shown in FIG. 1 having the viewing apparatus of the subject invention incorporated therein.

Referring now to FIG. 4, preview profiler 44 is shown and includes all of the components shown in FIG. 1 and these components have been labeled with the same numerical designations. In addition, preview profiler 44 includes a user operable rotating mirror 46, which may be rotated from the preview position, as seen by the solid lines, to the profile position, as seen by the dashed lines, upon command of the operator of preview profiler 44. While not shown, a rotary solenoid may be included with mirror 46 which operates in response to operator command. Mirror 46 is designed to permits a small portion (approximately 1%) of the light from laser beam 14P to pass therethrough when in the preview (solid line) position. The purpose of providing a slight amount of laser beam 14P light through mirror 46 is to enable the operator to view the exact line 40 to be profiled by laser beams 24, as well as the area 42 around the profile line 40.

In addition, preview profiler 44 includes a source of light, such as a light emitting diode (LED) 48 which provides narrow band light through a condensing lens 50 and polarizer 52 to a beam splitter 54. The polarization induced by polarizer 52 is the same as, or ninety degrees from, that induced by polarizer 16. It is desirable to utilize polarized light in preview system 44 in order to obtain the enhanced images for different vertical heights which may be provided using the Nomarski prism 22. Beam splitter 54 is positioned to direct the light from condensing lens 50 towards mirror 46 when mirror 46 is in the preview (solid line) position. Mirror 46 then reflects the light directed thereto from beam splitter 54 towards penta prism 20 along the same path that is followed by laser beam 14P.

By including condensing lens 50 in front of LED 48, the light from LED 48 provided through penta prism 20, Nomarski prism 22 and objective lens 26 will be focused below surface 28, rather than on surface 28 by objective lens 26. Thus, the area 56 on surface 28 illuminated as a result of providing the light from LED 48 is substantially larger than the small focal spot of the laser beams 24. It should be noted that objective lens 26 is positioned to focus the collimated laser beams 14P directly on surface 28, so by merely providing the condensing lens 50, the focusing by objective lens 26 is modified to provide the increased viewing area 42 necessary in the preview mode. Thus, condensing lens 50 acts as a defocusing element. Alternatively, the focusing of the light from LED 48 could have been above surface 28 to achieve the same effect of a large viewable area, relative to the small laser point. In other words, the beam from focusing lens 50 is noncollimated.

The light reflected off surface 28 from area 56, including the light from beams 24, is provided back through objective lens 26, Nomarski prism 22, penta prism 20 to mirror 46. The light is then reflected by mirror 46 to pass through beam splitter 54 towards mirror 58. From mirror 58, the reflected light is provided through polarizer 60 to imaging lens 62, which focus the reflected light of area 56 on a charged coupled device (CCD) array 64, which is a portion of a television camera. The output from CCD array 64 is provided to a display 66, which may be a conventional television monitor, and the illuminated area 56 on surface 28 is displayed for the operator to see. Because of the inclusion of the Nomarski wedge and polarizers 52 and 60, the viewing system operates as an Nomarski microscope and any change in vertical dimensions is enhanced. Further, because a portion of laser beam 14P is leaked through mirror 46, a bright spot at the middle of the view appears due to the additional light from laser beam 14 focused on surface 28. By storing the information, a complete view of the entire area to be scanned on surface 28 may be seen on display 66.

After previewing the area to be scanned and making any adjustments to the positioning of surface 28, as necessary, mirror 46 is rotated to the dashed line position and a normal profiling, as described above with respect to FIG. 1, then occurs.

What is claimed is:

1. In a topology scanning system in which a first beam of polarized light is directed by various optical elements along a defined path and is focused on a surface of an object to be scanned, one of said optical elements separating said first beam into a plurality of different polarization component beams prior to being focused on said surface, the improvement of optical viewing apparatus for viewing the area surrounding said defined path comprising:
   means for providing a polarized second beam of light;
   optical display means for providing a visual display manifested by light provided thereto;
   light reflecting means for being selectively inserted into said path prior to the separation of said beam, said light reflecting means permitting a portion of said first beam to pass therethrough; and
   means for directing said second beam towards said light reflecting means and along a portion of said defined path towards said surface and for directing the light from said first and second beams being reflected from said surface towards said light reflecting means to said optical display means for displaying the area surrounding said defined path.

2. The improvement according to claim 1 wherein said means for directing further includes defocusing means for causing the focal point of said second beam to be remote from said surface.

3. The improvement according to claim 1 wherein said means for directing further includes means for providing said second beam to said light reflecting means as a noncollimated beam.

4. The improvement according to claim 3 wherein said first beam is collimated.

5. The improvement according to claim 1 wherein said means for directing includes a beam splitter for directing said second beam towards said light reflecting means and for directing said reflected first and second beams towards said optical display means.

6. The improvement according to claim 5 wherein said optical display means includes a charge coupled device imaging array.

7. The improvement according to claim 1 wherein said optical display means includes a charge coupled device imaging array.

8. A surface profiler for detecting irregularities on a surface comprising:
   means for providing a source of collimated light at a defined polarization;
   means for focusing said collimated light upon an object having a surface to be profiled, said focused light being a pair of beams of different polarizations;
   means for detecting the reflected light from said surface and for processing said reflected light as a manifestation of surface smoothness;
   insertable means for being selectively inserted between said providing means and said focusing means for permitting a portion of said collimated light to pass therethrough, for permitting light from a second source directed thereto to be directed along the same path as said collimated light and for reflecting any light provided thereto which has been reflected from said surface;
   means for providing a source of noncollimated light at said defined polarization;
   means for directing said noncollimated light to said insertable means, said means for focusing further focusing said noncollimated light towards said surface at a focal point remote from said surface;
   means responsive to the light reflected by said insertable means for displaying the light reflected from that portion of said surface having said collimated and noncollimated light provided thereto.

9. The surface profiler according to claim 8 wherein said insertable means is a mirror which leaks a small percentage of the light from said collimated light.

10. The surface profiler according to claim 9 wherein said insertable means is a rotatable mirror which is inserted between said providing means and said focusing means only when it is desired to view a surface to be profiled and which is removed from between said providing means and said focusing means when it is desired to profile said surface.

11. The surface profiler according to claim 8 wherein said means for providing said source of collimated light includes a laser and a polarizer.

12. The surface profiler according to claim 8 wherein said means for focusing said collimated light includes a Nomarski prism and an objective lens.

13. The surface profiler according to claim 8 wherein said means for providing said source of noncollimated light includes light emitting means and optical means, said light emitting means being positioned remote from the focal point of said optical means.

14. The surface profiler according to claim 8 wherein said means for displaying includes a charged coupled device array imaging device.

15. The surface profiler according to claim 8 further including a beam splitter for directing said noncollimated light towards said insertable means and for directing said reflected light from said insertable means towards displaying means.

16. The surface profiler according to claim 15 wherein said insertable means is a mirror which leaks a small percentage of the light from said collimated light.

17. The surface profiler according to claim 16 wherein said insertable means is a rotatable mirror which is inserted between said providing means and said focusing means only when it is desired to view a surface to be profiled and which is removed from between said providing means and said focusing means when it is desired to profile said surface.

18. The surface profiler according to claim 17 wherein said means for focusing said collimated light includes a Nomarski prism and an objective lens.

19. The surface profiler according to claim 18 wherein said means for providing said source of noncollimated light includes light emitting means and optical means, said light emitting means being positioned remote from the focal point of said optical means.

20. The surface profiler according to claim 19 wherein said means for displaying includes a charged coupled device array imaging device.

21. In a topology scanning system in which a first beam of polarized light is directed by various optical elements along a defined path and is focused on a surface of an object to be scanned, one of said optical elements separating said first beam into a plurality of different polarization component beams prior to being focused on said surface, the improvement of optical viewing apparatus for viewing the area surrounding said defined path comprising:

means for providing a polarized second beam of light;

optical display means for providing a visual display manifested by light provided thereto;

light reflecting means inserted into said path prior to the separation of said beam for permitting a portion of said first beam to pass therethrough; and means for directing said second beam towards said light reflecting means and along a portion of said defined path towards said surface and for directing the light from said second beam being reflected from said surface towards said light reflecting means to said optical display means for displaying the area surrounding said defined path.

22. The improvement according to claim 21 wherein said means for directing further includes defocusing means for causing the focal point of said second beam to be remote from said surface.

23. The improvement according to claim 21 wherein said means for directing further includes means for providing said second beam to said light reflecting means as a noncollimated beam.

24. The improvement according to claim 23 wherein said first beam is collimated.

* * * * *